United States Patent
Shin et al.

(10) Patent No.: US 10,171,638 B2
(45) Date of Patent: Jan. 1, 2019

(54) FORCE SENSING BASED ON STRUCTURE-BORNE SOUND PROPAGATION

(71) Applicant: THE REGENTS OF THE UNIVERSITY OF MICHIGAN, Ann Arbor, MI (US)

(72) Inventors: Kang G. Shin, Ann Arbor, MI (US); Yu-Chih Tung, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 165 days.

(21) Appl. No.: 15/414,683

(22) Filed: Jan. 25, 2017

(65) Prior Publication Data
US 2017/0220171 A1   Aug. 3, 2017

Related U.S. Application Data (60) Provisional application No. 62/289,500, filed on Feb. 1, 2016.

(51) Int. Cl.
| | | |
|---|---|---|
| *H04M 1/02* | (2006.01) | |
| *G06F 3/16* | (2006.01) | |
| *G06F 1/16* | (2006.01) | |
| *G06F 3/041* | (2006.01) | |

(52) U.S. Cl.
CPC ........ *H04M 1/0266* (2013.01); *G06F 1/1684* (2013.01); *G06F 3/041* (2013.01); *G06F 3/165* (2013.01); *G06F 2203/04105* (2013.01)

(58) Field of Classification Search
CPC .... H04M 1/0266; G06F 3/041; G06F 1/1684; G06F 3/165; G06F 2203/04105
See application file for complete search history.

(56) References Cited

U.S. PATENT DOCUMENTS

| | | | |
|---|---|---|---|
| 2011/0291821 A1* | 12/2011 | Chung, II | G06F 3/03547 340/407.2 |
| 2012/0230517 A1* | 9/2012 | Lee | G06F 3/043 381/120 |

(Continued)

OTHER PUBLICATIONS

A. Mujibya et al "The Sound of Touch: On-body Touch and Gesture Sensing Based on Transdermal Ultrasound Propagation" Proceedings of the 2013 ACM international conference on interactive tabletops and surfaces (Oct. 2013).

(Continued)

*Primary Examiner* — Andrew Wendell
*Assistant Examiner* — Maryam Soltanzadeh
(74) *Attorney, Agent, or Firm* — Harness, Dickey & Pierce, P.L.C.

(57) ABSTRACT

ForcePhone is a novel system for enabling phones to recognize the force applied to their touchscreen and/or body. ForcePhone uses built-in sensors to measure the applied force via a physical property called structure-borne sound propagation. The phone plays an inaudible sound through the phone's speaker. When the phone is free to vibrate, the sound from the speaker easily travels through its body to the phone's microphone. When a force is applied to the phone, vibration is restricted and the sound traveling through the pathway is degraded. ForcePhone estimate the amount of applied force by monitoring the change in sound degradation.

26 Claims, 9 Drawing Sheets

(56) References Cited

U.S. PATENT DOCUMENTS

| | | | |
|---|---|---|---|
| 2013/0222267 A1* | 8/2013 | Almalki | G06F 3/0416 |
| | | | 345/173 |
| 2014/0260642 A1 | 9/2014 | Goel et al. | |
| 2014/0306937 A1* | 10/2014 | Lim | G06F 3/0416 |
| | | | 345/177 |
| 2014/0327643 A1* | 11/2014 | Sun | G06F 3/16 |
| | | | 345/174 |
| 2015/0205400 A1 | 7/2015 | Hwang et al. | |
| 2017/0285789 A1* | 10/2017 | Barel | G06F 3/0412 |

OTHER PUBLICATIONS

Y. Tung et al "Expansion of Human-Phone Interface by Sensing Structure-Borne Sound Propagation" MobiSys '16, (Jun. 2016).

M. Ono et al "Touch & Activate: Adding Interactivity to Existing Objects using Active Accoustic Sensing" UIST'13 (Oct. 2013).

M. Ono et al "Sensing Touch Force using Active Acoustic Sensing", TEI '15 (Jan. 2015).

S. Hwang et al "PseudoButton: Enabling Pressure-Sensitive Interaction by Repurposing Microphone on Mobile Device" CHI'12 (May 2012).

\* cited by examiner

FORCE SENSING BASED ON STRUCTURE-BORNE SOUND PROPAGATION

CROSS-REFERENCE TO RELATED APPLICATIONS

This application claims the benefit of U.S. Provisional Application No. 62/289,500, filed Feb. 1, 2016. The entire disclosure of the above application is incorporated herein by reference.

FIELD

The present disclosure relates to a force sensing based on structure-borne sound propagation.

BACKGROUND

As smartphones become an essential part of our daily activities, human-phone interactions have become a norm. To enhance the input capability on the severely limited space of a phone's touch screen, researchers and practitioners have been seeking various ways to expand the input dimensions. For example, an augmenting force-sensitive, deformable, or squeezable input is shown to enrich the input vocabulary significantly, especially for the one-hand operations. However, most of those extended input interfaces have not yet been fully developed nor deployed in commodity phones for two reasons. First, they usually require additional hardware, such as capacitive or contact piezoelectric sensors, which are usually unavailable in commodity phones, and the requirement of additional cost and space make them less attractive to phone users and manufacturers. Second, systems based only on built-in sensors usually impose unnatural/inconvenient usage restrictions because it is challenging to know those interactions without additional sensors. For example, users are required to touch the microphone reception hole or block the camera flash light source for sensing a touch interaction, both of which limit the usability of this additional sensing. Other systems require continuous vibration of the phone with a vibration motor, causing significant annoyance to users. To the best of our knowledge, the only commodity phone supporting a force-sensitive touch screen is the latest iPhone 6s, enabled by their proprietary sensors. Unlike these systems, a new, inexpensive solution is proposed, which provides a force-sensitive input interface to commodity phones without any addition/modification of hardware and is referred to herein as ForcePhone. Moreover, ForcePhone provides this force-sensing capability to the touch screen as well as the phone's body, called a squeezable interface.

This section provides background information related to the present disclosure which is not necessarily prior art.

SUMMARY

This section provides a general summary of the disclosure, and is not a comprehensive disclosure of its full scope or all of its features.

A method is presented for estimating force applied to a touchscreen of a mobile device, preferably using the device's built-in sensors. This method relies on a model that defines a mathematical relationship between magnitude of force applied to a touchscreen of the mobile device and change in a sound signal propagating through the mobile device. The method includes: emitting a sound signal from a speaker of the mobile device while a force is applied to the touchscreen; receiving the sound signal emitted from the speaker with a microphone in the mobile device; and estimating the force applied to the touchscreen from the emitted sound signal and the received sound signal and using the model. The sound signal emitted from the speaker is inaudible to user of the mobile device and preferably has a frequency greater than 18 kHz.

In some embodiments, the frequency of the sound signal generated by the speaker is swept across a range of frequencies.

Estimating the force applied the touchscreen may further include: correlating the received sound signal with the emitted sound signal; identifying largest correlation peak between the received sound signal and the emitted sound signal; determining magnitude of the received sound signal immediately preceding the largest correlation peak; determining a change in propagation of the emitted sound signal using the magnitude of the received sound signal immediately preceding the largest correlation peak; and computing magnitude of force applied to touchscreen as a function of the change in propagation of the emitted sound signal.

In one embodiment, the change in propagation of the emitted sound signal can be achieved by detecting beginning of a touch on the touchscreen; determining magnitude of the received sound signal at beginning of a touch, $s_{start}$; and determining signal changing ratio, r(t), at subsequent time in accordance with $r(t)=(s(t)-s_{start})/s_{start}$, where s(t) is magnitude of the received sound signal at the subsequent time, t.

In some embodiments, a squeeze of the mobile device can be detected from the emitted sound signal and the received sound signal. The squeeze can be detected by correlating the received sound signal with the emitted sound signal, detecting peaks in the correlated sound signal, and identifying the squeeze based on number of detected peaks in the correlated sound signal, width of the detected peaks and peak-to-valley ratio for the detected peaks.

In another aspect, a system is developed for estimating force applied to a touchscreen of a mobile device, such as a phone. The system includes: a speaker integrated into the mobile device; a sound manager operably coupled to the speaker and, in response to a trigger, generates a sound signal via the speaker, where the sound signal preferably has a frequency greater than 18 kHz; a data store that stores a model for estimating force, wherein the model defines a mathematical relationship between magnitude of force applied to the touchscreen of the mobile device and change in a sound signal propagating through the mobile device; a microphone integrated into the mobile device; and a force estimator configured to receive sound signals captured by the microphone and, in response to detecting a touch on the touchscreen, estimating the force of the touch using the model. The force estimator computes a change in the sound signal propagating through the mobile device from the sound signal emitted from the speaker and the sound signals captured by the microphone, and determines the force of the touch from the computed change in the sound signal. The sound manager and the force estimator may be implemented by processor readable instructions executed by a computer processor in the mobile device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
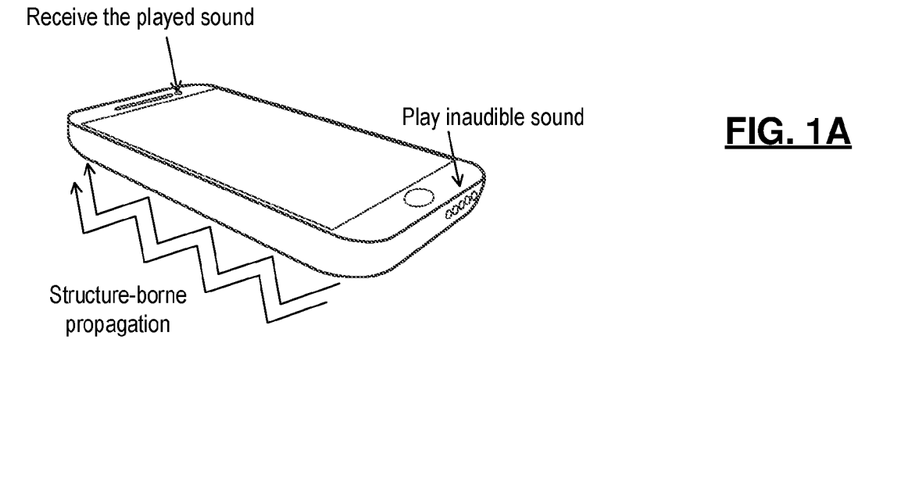
FIGS. 1A and 1B are diagrams depicting structure-borne propagation with and without an applied force, respectively.
Figure 1B:
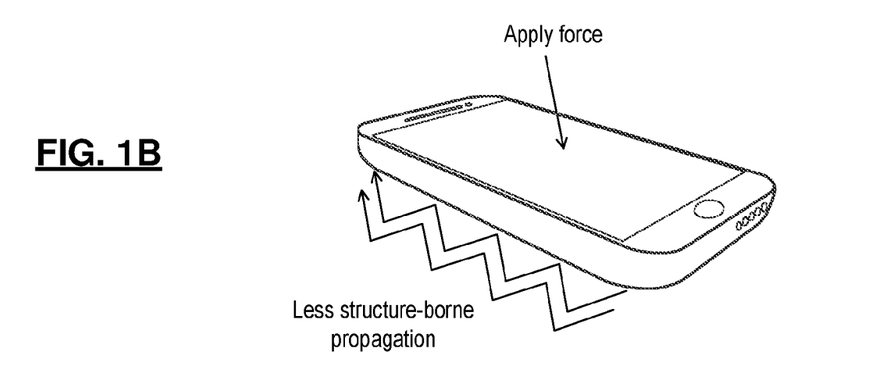

ForcePhone estimates the user-applied force by utilizing the structure-borne sound propagation, i.e., the sound transmitted through subtle vibrations of the device body. In most designs, such as headphones or pipe-work, this type of propagation is usually considered as a mechanical noise, but ForcePhone uses it in a novel way to estimate the force applied to commodity phones. As shown in FIG. 1, when the phone is left free to vibrate (e.g., the user is not touching/squeezing the phone), the sound sent from the phone's speakers can easily travel through its body to its microphone. However, when force is applied to the phone, it restricts the phone body's vibration with the sound, thus degrading the sound traveling through this structure-borne pathway. ForcePhone estimates the amount of force applied to the phone by monitoring the change of this degradation. While reference is made throughout this disclosure to phones, it is readily understood that the techniques described herein are applicable to other types of mobile computing devices, including but not limited to tablets.

Figure 2:
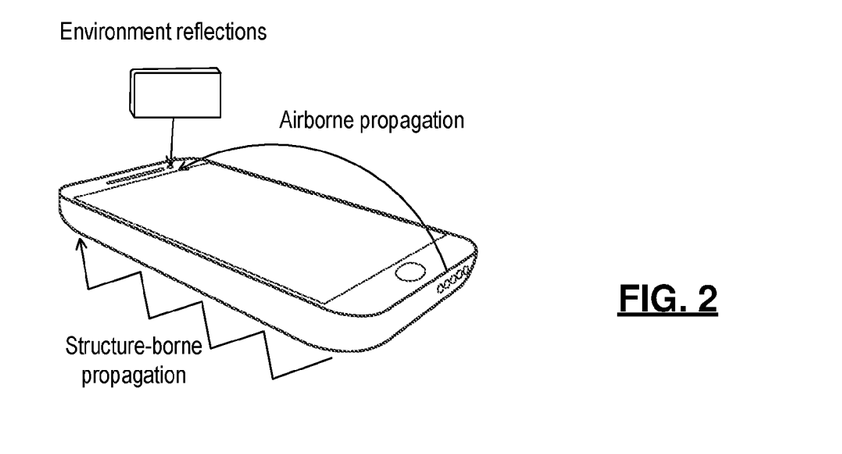
FIG. 2 is a diagram depicting different sound signals received by a phone.

Sound is a mechanical wave broadcasted by compressions and rarefactions. The most common material for sound to propagate is the air, which is known as airborne propagation. Besides the air path, as shown in FIG. 2, when the sound is generated and received by the same device, its body becomes another pathway for the sound to travel, which is called structure-borne propagation. Since the structure-borne propagation is usually unrelated to the intended application, it is generally considered as a noise. However, ForcePhone utilizes it in a novel way to estimate the force applied to the phone by monitoring the degradation of structure-borne propagated sound.

Figure 3:
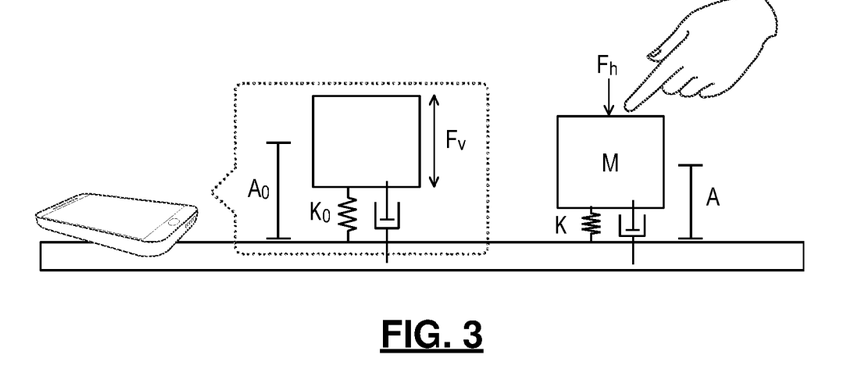
FIG. 3 is a diagram of an example phone vibration model.

With reference to FIG. 3, a vibrating phone is modelled as a forced, damped mass-spring system, where the phone vibrates up and down with the force $F_v$, which is caused by the sound played at the phone speaker. When there is no external force applied, the phone can vibrate freely with amplitude $A_0$, which is captured by the system's effective spring constant $K_0$, and also the damping coefficient. Moreover, since the phone is considered as a rigid body, the equilibrium is located at $A_0$ above the table. Based on Hooke's law, when an external force $F_h$ is applied to the screen, the system equilibrium moves downward by $F_h/K_0$. However, since the phone (a rigid body) is impossible to move downward "into" the table, the applied force also makes the system spring constant increase to K so as to meet this equilibrium change and rigid body constraint. In such a case, if the vibration energy is constant, the potential energy for both systems will be identical, thus leading to:

$$\frac{1}{2}K_0 A_0^2 = \frac{1}{2}KA^2 = \frac{F_h}{A_0 - A}A^2 \qquad (1)$$

which defines the relation between the applied force and the reduced vibration amplitude. Note that this basic model is designed only for illustrative purpose as it doesn't consider the horizontal vibration and the increased friction caused by the applied force. Moreover, since the hand and the table also slightly vibrate with the phone, the system's damping coefficient and effective mass will change accordingly, which are not accounted for, either. However, according to our vibration measurements, this simplified model suffices to describe the principle of ForcePhone's operation.

A Polytec OFV-303 laser vibrometer was used to measure the nm-level vibration of a phone, capturing the change of structure-borne propagation caused by touching the phone with hand. Compared to capturing the structure-borne propagation via microphones (which ForcePhone is using as described below), this vibration measurement helps neglect the noises caused by the air-propagated sound and the imperfect microphone hardware. The laser's focus has been calibrated before the test to ensure that the laser beam will be reflected properly by the phone surface. The latest Apple iPhone 6s is used for these measurements owing to its capability of estimating the applied force. Thumb is used to apply force at the middle of the phone and the iPhone 3D Touch reading (ranging from 0 to 1) is used as a reference of the applied force. From a preliminary test, it was found that the Apple 3D Touch sensors can only read the applied force up to about 380 g. Hence, the same measurements are repeated with the Interlink force sensor which can measure force up to 10 kg. Its current change caused by the applied force is recorded by the Monsoon power monitor.

Figure 4A:
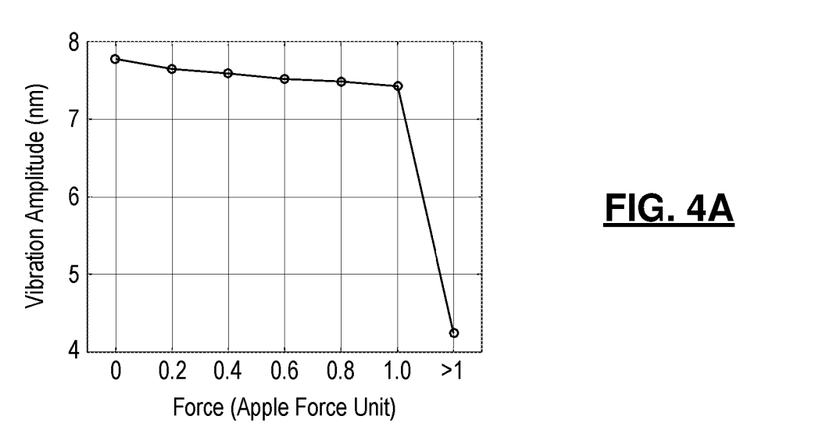
FIGS. 4A and 4B are graphs illustrating phone vibration damped by force and the correlation between the damped vibration and the applied force.
Figure 4B:
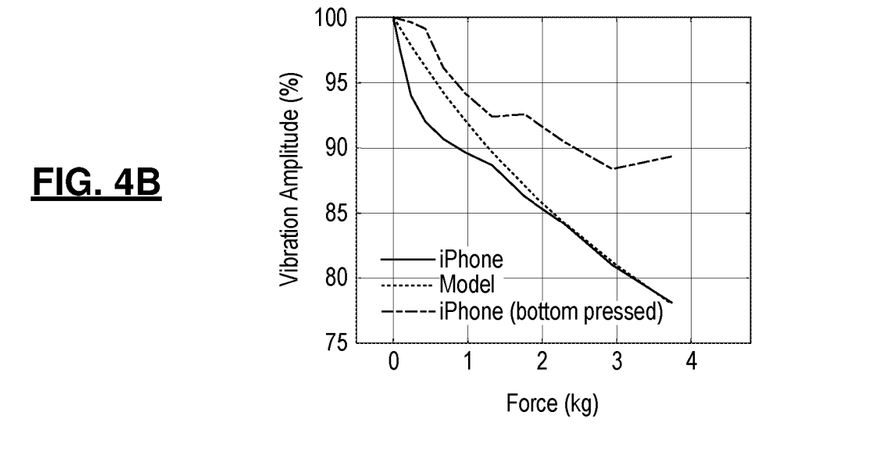

FIGS. 4A and 4B shows the results of phone vibration while applying different amounts of force. As shown in FIG.

4A, when the Apple 3D Touch reaches its maximum sensitivity, the amplitude of phone vibration decreases about 5%. If more force is applied (marked as >1), near 50% of the vibration amplitude is damped by hand. FIG. 4B shows the results of measuring the force with external force sensors. The vibration amplitude also decreases about 5% when a 380 g force is applied to the phone. The system model is shown to be able to capture the main trend of vibration amplitude when the initial system spring constant $K_0=2.7$ (kg/nm) is assumed. The most important property observed in this experiment is the high correlation between the applied force and the decreased vibration amplitude. Based on this property, ForcePhone can provide useful force-sensitive applications as further described below.

As mentioned earlier, the model is not perfect. For example, as shown in FIG. 4B, when the force is applied to the bottom of the phone, it incurs less vibration change since the measured location (i.e., the top of the phone) has less restriction when pressing the bottom part. A similar phenomenon also occurs when different speakers are used to play sound. Thus, it is necessary for ForcePhone to make a one-time calibration for unifying different estimations when force is applied at different locations on the screen. The calibration needs to be tuned to the phone models as they have varying vibration patterns depending on the phone material. For example, the vibration of Galaxy Note 4 is found to be 50% larger than the vibration of iPhone 6s, and more sensitive to the applied force since its plastic body is easier to compress. It was also found, for some phone models, such as iPhone 6s, this vibration decays too fast when sound is played by the bottom speaker and received by the top microphone, making the force estimation less accurate. In such a case, the top speaker is used to get an adequate signal to noise ratio (SNR) of collected sound even though the collected sound will include a part of airborne propagation components.

Figure 5:
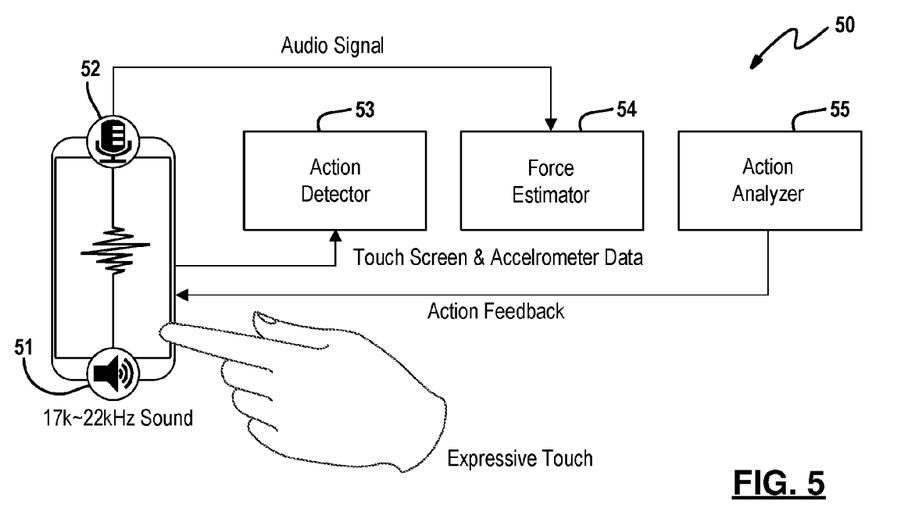
FIG. 5 is a diagram depicting a system overview.

FIG. 5 is an overview of the ForcePhone force detection system 50. The system 50 actively plays an inaudible sound with the phone speaker 51, and then picks up this sound with the phone microphone 52. The touch screen input (such as the location or the start time of a touch) and the data from the other motion sensors are also recorded by action detector 53. These sensor data are then used by force estimator 54 to improve the force estimation and reduce the number of false detections. When force is applied to the touch screen (or the other parts of the phone body), the action analyzer 55 triggers the pre-designed feedback/behavior based on the monitored (inaudible) sounds and user motions. While reference is made to estimating force applied to a touchscreen, it is understood that force may be estimated for touches to other parts of the mobile device, including but not limited to home button, volume up/down button or power button.

The design of emitted sound is critical to the system performance. In an example embodiment, the force detection system 50 uses a 1200-sample linear chirp from 18 kHz to 24 kHz. A hamming window is multiplied to the first and last of 300 samples to eliminate the audible noise caused by spectral leakage. The system samples this chirp at 48 kHz and replays it every 50 ms. This sound is designed to achieve (i) minimal user annoyance, (ii) high SNR, and (iii) adequate force sensing delay although other types of sound signals are contemplated by this disclosure.

Humans are shown to have a limited ability to hear sound above 20 kHz. Thus, the emitted sound signal preferably has a frequency greater than 20 kHz. Since most modern smartphones only support the sampling rate up to 48 kHz, the highest sound frequency to use is 24 kHz. This setting is likely to be expanded in the near future; for example, the latest iPhone already supports 96 kHz sample rate. Experiments have shown that playing a high frequency chirp directly is still audible to humans because an abrupt increase/decrease of energy in time domain incurs frequency leakages. To avoid this problem, the force detection system may use a similar windowing process to remove this audio artifact. This design choice will cause SNR degradation when estimating the audio correlation of received/sent signals, but it is practically important to avoid any audible sound. Note that the chirp starts at 18 kHz but the signal below 20 kHz is still inaudible because the beginning of the chirp is played only at the minimal volume (windowing). None of the participants in a user study noticed/heard the sound used in ForcePhone.

Figure 6:
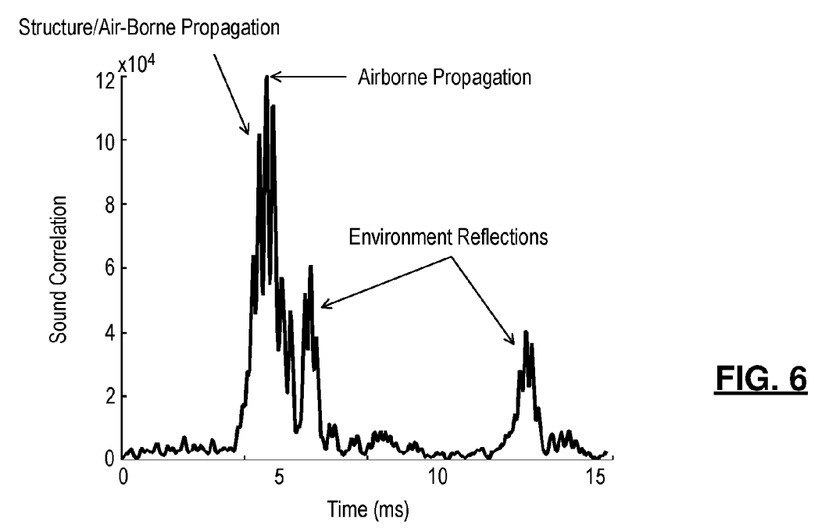
FIG. 6 is a graph illustrating the sound signal received by a microphone of the phone.

Ideally, less stop time between chirps will provide a smaller sensing delay, but the chirps in force detection system are designed to be played every 50 ms. This parameter setting is chosen to prevent the inclusion of audio signals reflected by environments as an unexpected/unwanted noise. For example, as shown in FIG. 6, after the sound transmitted via airborne propagation (i.e., the highest correlation peak) is received, there are multiple following local peaks which indicate the reception of sound reflected by the environment. From experiments, the received reflections are found to degrade 20 dB after 25 ms, which is small enough to let the system play and receive the next round of chirp correctly with only minimal noise due to environmental reflections. Thus, it is preferably for the force detection system 50 to have a 25 ms (i.e., 1200-sample) stop time after playing each chirp although other time intervals between chirps are also contemplated by this disclosure.

ForcePhone uses signal correlation (also known as the matched filter) to estimate the reception of the played sound. The SNR of this correlation in the chirp is proportional to the signal length and sweeping frequency. The sweeping frequency is selected in order to not annoy users and cope with the hardware limitation while setting the signal length to 25 ms. Even though a longer chirp can achieve a higher SNR, it also increases the sensing delay because ForcePhone needs to wait for the completion of the sound being played. To strike a balance between SNR and the sensing delay, the force detection system sets the chirp length to 25 ms, which makes the total delay in sensing each chirp equal to 50 ms (i.e., 20 force estimations can be made every second). This setting is found to provide enough SNR for estimation of the applied force and an adequate sensing delay which meets most users' needs. Variation in these parameters is envisioned for other embodiments.

Figure 7:
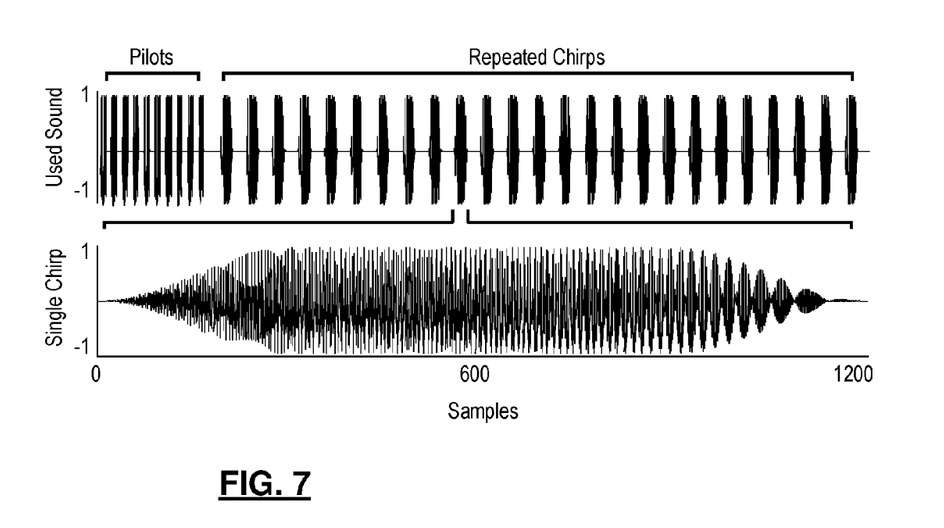
FIG. 7 is a graph illustrating an example sound signal transmitted by the speaker of the phone.

Besides the design of sound signal, there is another parameter that affects the received SNR: the phone's speaker volume. In the example embodiment, the audio volume is set to 50% of the maximum to avoid some audible noise due to the imperfect speaker hardware and deal with the coexistence of multiple phones that run ForcePhone. An example of the emitted sound signal is shown in FIG. 7. One thing to note is that there are 10 additional chirps sweeping from 24 kHz to 10 kHz played before the above-mentioned chirps, which are used as the pilot signal for synchronizing the timing of the phone's microphones and speakers. If the synchronization fails, the force detection system 50 will stop the sensing process and replay the pilot to achieve correct time synchronization.

ForcePhone utilizes the structure-borne sound propagation to estimate the applied force. When force is applied to the phone body, the hand in contact with the phone body damps/degrades the structure-borne sound propagation.

Besides the structure-borne propagation, there are other factors that affect the received sound strength. For example, the airborne propagation might be blocked by hand, and the overall sound signal strength may be enhanced by reflections from the environment or the internal resonant. In the example embodiment, these noises are identified and removed by timestamping the received audio signal. For example, the reflection from an object 10 cm away will be received 28 samples later than the airborne propagation since it travels a 10 cm longer distance. Moreover, sound usually travels 100× faster in a solid phone. Thus, in this embodiment, the structure-borne propagation will be received 21 samples ahead of the airborne propagation when the microphone and the speaker are 15 cm apart. Based on these observations, the force detection system 50 uses the signal which immediately precedes the largest correlation peak (e.g., 20 samples ahead of the airborne propagation) as the indicator of the structure-borne propagation, thus filtering out or removing the most undesirable noise.

Note that the reference of airborne propagation is assumed to be the strongest audio correlation because the sound energy decays faster through the solid phone body and absorbed more on the reflection objects than air. Ideally, the temporal −3 dB width of audio correlation are 7 samples for the chirp selection in the example embodiment, so it would be possible to find a clear peak ahead of the airborne propagation, indicating the reception of structure-borne propagation. However, as shown in FIG. 6, there is no such clear peak found before airborne propagation, and the temporal −3 dB width of audio correlation is about 40 samples in this measurement. This phenomenon is caused by the adoption of windowing, which suppresses the frequency-domain signal leakage but incurs the time-domain signal leakage. This 20-sample-ahead sampling heuristic will thus include both air- and structure-borne propagations. Thus, to get a reliable estimation of the applied force, the force detection system 50 utilizes the sound strength when the touch begins as a reference to estimate the subsequent change caused by the force applied later. For example, ForcePhone subtracts the current estimated sound correlation to the sound correlation when the detect starts, which extracts the sound strength contributed by the airborne propagation. The used metric for force estimation is called the signal change ratio, which is described as follows. In the remainder of this disclosure, the sound correlation at time t is denoted as signal s(t) and the signal at the beginning of a touch as $s_{start}$. The subsequent force at t is estimated based on a metric called the signal changing ratio $r(t)=|s(t)-s_{start}|/s_{start}|$. The applied force f(t) at time t is then determined by a linear regression model with r(t). The linear regression model is only a one-time calibration among the locations and devices to sense the applied force. For example, in the current embodiment, the force applied to the center of iPhone 6s is estimated as $f(t)=\sqrt{r(t)}+8r(t)$, which is set by the external force sensor and ForcePhone by 20 touches. Other models also fall within the scope of this disclosure.

Figure 8A:
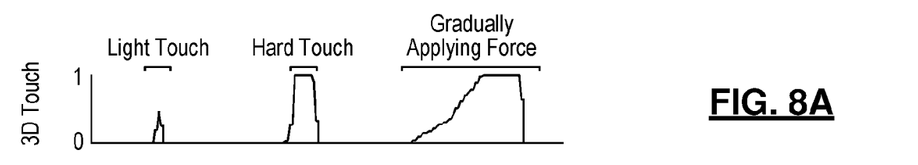
FIGS. 8A-8D are graphs illustrating response of different amounts of applied force as determined from Apple 3D touch sensors, motion sensors, the sound signal received by the microphone and the estimate from the signal changing ratio, respectively.
Figure 8B:
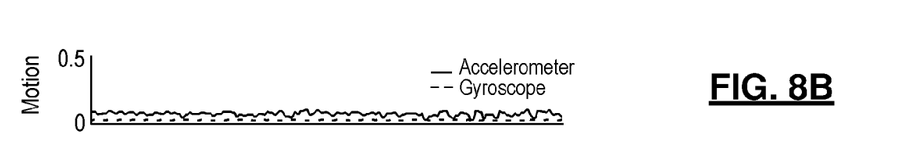
Figure 8C:
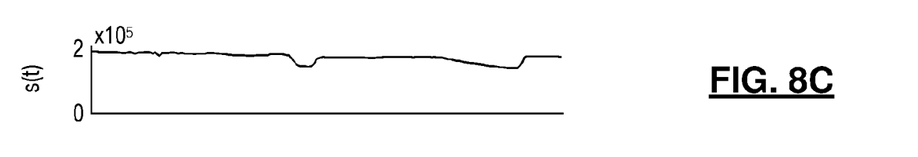
Figure 8D:
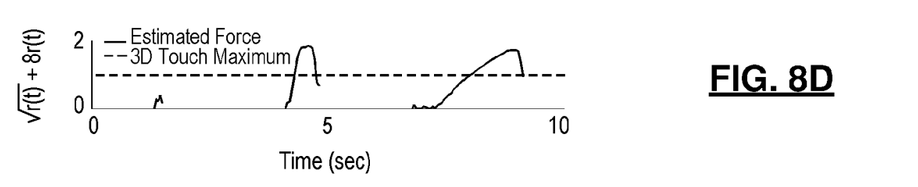

FIGS. 8A-8D show a real-world example of applying force to an iPhone 6s placed on a wooden table. In this example measurement, there are 3 different types of touch, each with a different applied force: (1) light touch, (2) hard touch, and (3) touch with a gradually increasing force. In FIG. 8A, the ground truth of the applied force can be read from the Apple 3D Touch sensors. In FIG. 8B, motion sensors can only detect the slight movement at the start/end of a touch but are unable to determine the applied force. The sound signal received by the microphone is shown in FIG. 8C. In FIG. 8D, the estimated force is visualized as $\sqrt{r(t)}+8r(t)$; the intuition behind this setting will be discussed later. The heuristic based on r(t) captures most of the force characteristics even when the applied force exceeds the maximum sensing range of Apple 3D Touch.

Note the calibration between f(t) and r(t) varies with the location of force applied on the phone. Thus, a preparatory experiment is needed for each phone model before Force-Phone is activated. However, this calibration is just a one-time requirement, which is different from other sound-fingerprinting systems that need laborious training each time before using the application. The current implementation of ForcePhone is calibrated by external force sensors. Most participants of the usability study are comfortable with the current setting.

Figure 9:
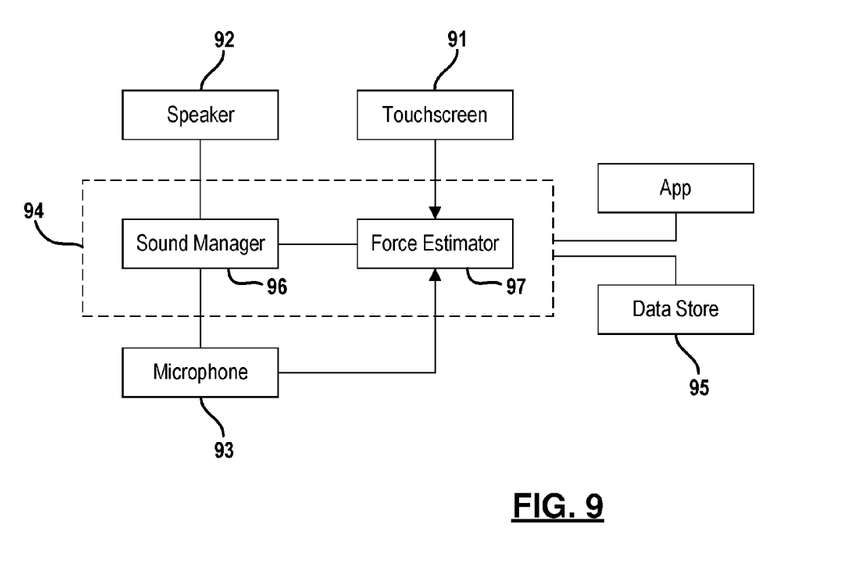
FIG. 9 is a diagram depicting an example embodiment of a system that estimates force applied to a touchscreen.

FIG. 9 depicts an example embodiment of a system 90 that estimates force applied to a touchscreen of a mobile device. The system 90 includes a touchscreen 91, one or more speakers 92, a microphone 93 and a computer processor 94 as is commonly found in such devices. The system 90 further includes a data store 95 that stores a model for estimating force, where the model defines a mathematical relationship between magnitude of force applied to the touchscreen of the mobile device and change in a sound signal propagating through the mobile device. Models that define a mathematical relationship between magnitude of force applied to other parts of the mobile device and change in a sound signal propagating through the mobile device are also contemplated by this disclosure. Although not limited thereto, example mobile devices include mobile phones, PDAs, laptops, tablets and wearable devices (e.g., watches).

A sound manager 96 is operably coupled to the speaker 92. In response to a trigger, the sound manager generates a sound signal, for example as described above in relation to FIG. 7. In an example embodiment, force estimates may be associated with a particular app executing on the device, such as Facebook. Once a user navigates to the app, the sound manager 96 is triggered to continually generate a sound signal via the speaker. The sound manager 96 may also interface with the microphone 93 to capture the sound signal being generated by the speaker 92.

A force estimator 97 is interfaced with the sound manager 96 and configured to estimate the magnitude of a force applied to the touchscreen 91. The force manager 96 may receive the sound signals captured by the microphone from the sound manager 96 or directly from the microphone 93. In an example embodiment, the force estimator 97 is also configured to receive input from the touchscreen 91 and estimate the magnitude of a force applied to the touchscreen only in response to detecting a touch on the touchscreen. An example method for estimating the force as implemented by the force estimator 97 is further described below in relation to FIG. 10. In one embodiment, the sound manager 96 and the force estimator 97 are implemented by processor readable instructions executed by the computer processor 94 in the mobile device.

Figure 10:
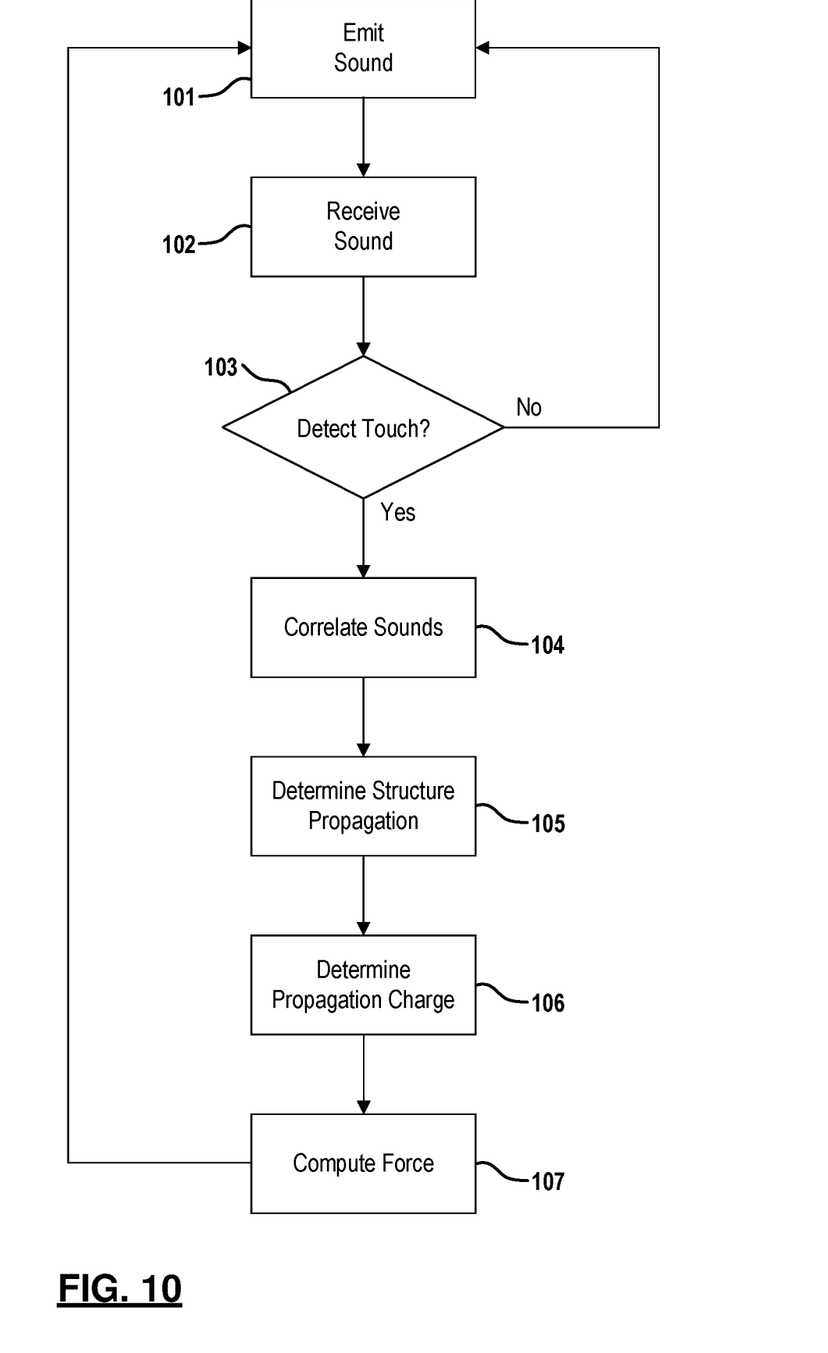
FIG. 10 is a flowchart depicting an example method for estimating magnitude of the force applied to the touchscreen.

FIG. 10 further depicts an example method for estimating magnitude of a force applied to a touchscreen. First, a sound signal is emitted at 101 from the speaker 92 while a force is being applied to the touchscreen. To ensure that the sound signal is concurrent with the touch, the sound signal may be emitted continually, for example during execution of a particular app. Sound signals are in turn captured at 102 by the microphone 93.

In the example embodiment, a touch on the touchscreen will initiate the force estimation. In response to detecting a touch on the touchscreen, force is estimated as indicated at 103; otherwise, processing continues without a force estimation. In some embodiments; force may be estimated continuously by the force estimator and subsequently correlated with a detected touch on the touchscreen. In yet other embodiments, other types of triggers may be used to initiate force estimation.

Force estimation is made generally by computing a change in the sound signal propagating through the mobile device as derived from the sound signal emitted from the speaker and the sound signals captured by the microphone, and then determining the magnitude of the force from the computed change in the sound signal. More specifically, the received sound signal is correlated at 104 with the emitted sound signal. A determination is then made at 105 as to the structure-borne propagation of the emitted sound signal through the device while the force is being applied. For example, this determination is made by identifying largest correlation peak between the received sound signal and the emitted sound signal which represents the airborne propagation and determining the magnitude of the received sound signal immediately preceding the largest correlation peak. In the example embodiment described above, the peak immediately preceding the largest correlation peak represents the structure-borne propagation and is found in the twenty samples preceding the largest correlation peak. Other signal processing techniques for determining structure-borne propagation are also contemplated by this disclosure.

Next, a determination is made at 106 as to the amount of change in the sound signal representing the structure-borne propagation. In the example embodiment described above, a signal changing ratio is computed as follows: $r(t)=(s(t)-s_{start})/s_{start}$, where $s(t)$ is magnitude of the received sound signal that represents the structure-borne propagation (i.e., magnitude of the peak immediately preceding the largest correlation peak) and $s_{start}$ is the magnitude of the received sound signal at beginning of a touch. Other techniques for determining the amount of change also fall within the scope of this disclosure.

Lastly, the magnitude of force applied to touchscreen is computed at 107 by inputting the change in propagation of the emitted sound signal into the model. The force estimation process continues at 101, for example until the particular app is exited. In the example embodiment, this method is implemented by the force estimator module 97 in the detection system 90. It is to be understood that only the relevant steps of the methodology are discussed in relation to FIG. 10, but that other software-implemented instructions may be needed to control and manage the overall operation of the system.

Figure 11:
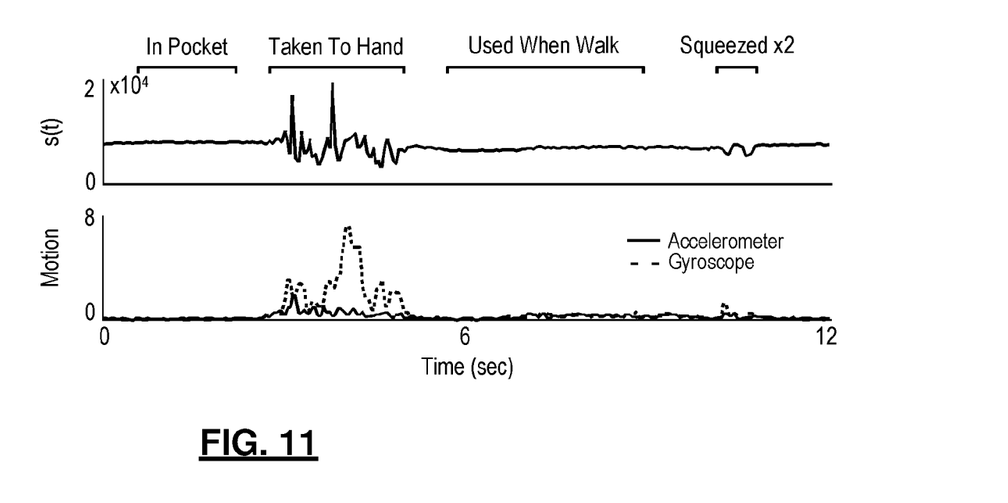
FIG. 11 is a graph depicting sound correlation from movement of the phone that may occur during normal use.

FIG. 11 shows an example of the observed signal change when a phone is taken out of the pocket with hand, used while walking, and then squeezed twice. As shown in this figure, even though the signal response of a squeeze is clearly observable, it is also possible to include lots of noise due to the phone's movements. To avoid this noise from large phone movements, a motion detector is built based on both accelerometer and gyroscope readings, which turns off squeeze detection when there is a large phone movement and the signal is noisy. A threshold is set to turn off the detection during large phone movements (such as taking the phone out of pocket and transferring it to a hand) but keep the squeeze function on during slow/small phone movements, such as walking and using the phone in hand.

Squeeze detection is another aspect of this disclosure. Even though the movement noise is removed by the motion detector, determining if the user squeezes the phone is still harder than estimating the force applied to the touch screen. Due to the lack of touch screen input, one does not know when the squeeze starts. Moreover, the location of squeeze is inaccessible, thus making it difficult to perform a proper calibration. To solve these issues, a squeezable back function is made to respond only to a predefined squeeze behavior, such as double squeezes applied to the phone's left and right body frame, and the entire squeeze process is assumed to complete in 1.5 seconds.

Figure 12A:
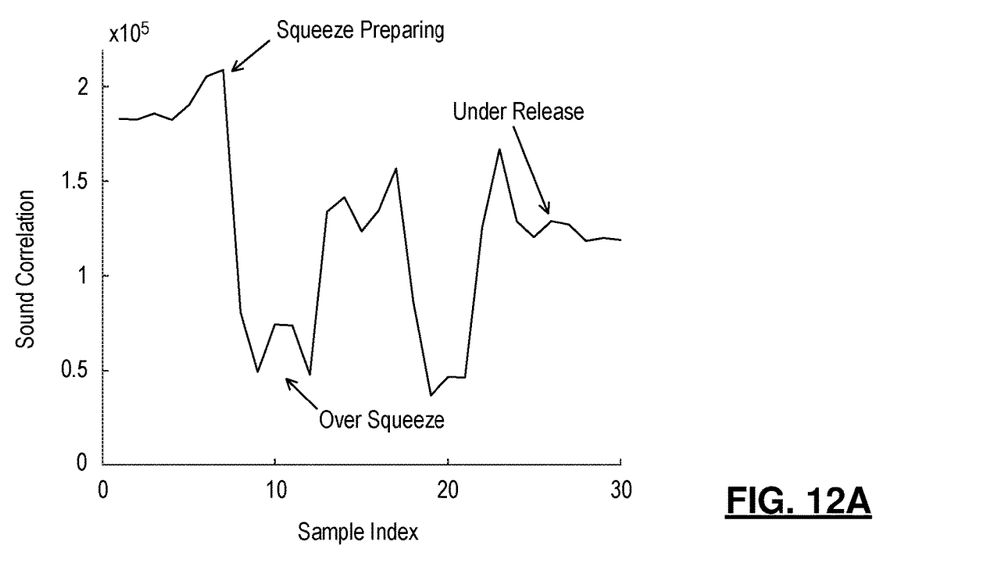
FIGS. 12A and 12B are graphs depicting sound correlation and single change ratio, respectively, when the phone is squeezed.

FIG. 12A shows an example of this predefined squeeze response, where the applied squeezes cause two significant signal drops at sample index 10 and 20. Besides the signal response to the squeeze operation, there are three characteristics of human squeezing behavior, which are critical to the design of squeeze detection. First, the applied force might decrease slightly before a squeeze, probably because the users need to relax their hands before squeezing their phone. After the squeeze, the applied force may also decrease around the expected force peak. This phenomenon is called over-squeeze, and it is caused by the fact that users actually release part of their fingers/palms from the phone body when they try to apply more force with the other part(s) of the hand. At the end of squeeze, the applied force may not return to its initial condition either, because the users may change their position of holding the phone during the squeeze.

Figure 12B:
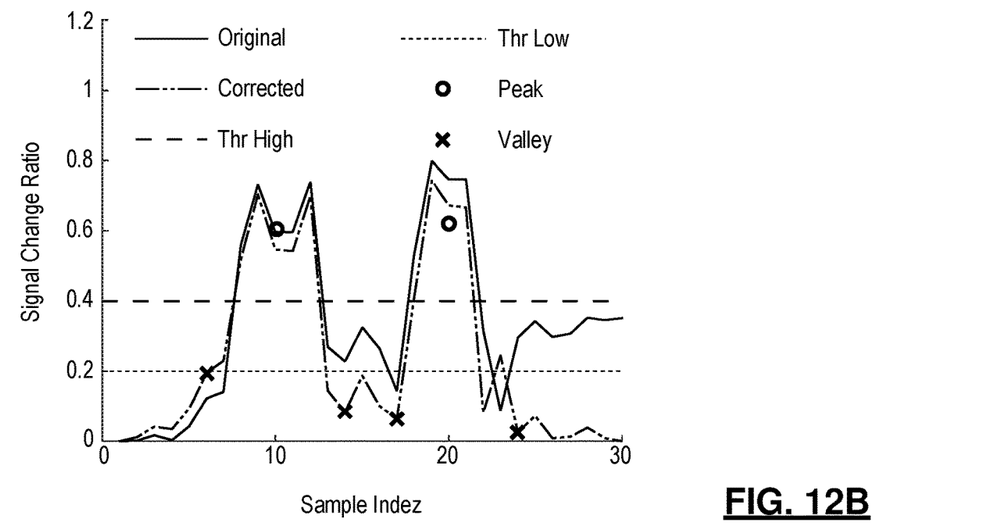

Squeezes are also detected based on a signal change ratio $r(t)$. In the example embodiment, the force detection system continuously checks each 30-sample received signal to see if the predefined squeeze pattern has occurred. As the hand position is likely to change during a squeeze, it is less accurate to estimate the applied force based only on $s_{start}$. For example, the larger drop of the second squeeze shown in FIG. 12A might be caused by a hand position change rather than a larger squeezing force. To account for this phenomenon, the reference signal is heuristically set based on both the start and end of this 30-sample signal. This new reference signal varies over time and is defined as $s(t)_{reference} = ((t_{end}-t)s_{smart}+t-t_{start})s_{end})/t_{end}-t_{start})$. The signal change ratio is calculated based on $s(t)_{reference}$ using the same process as described earlier; that is, replacing $s_{start}$ with $s(t)_{reference}$ and computing the signal change ratio, $r(t)$. Basically, this method estimates $r(t)$ by weighting the reference signal proportional to the difference between $t$ and $t_{smart}$, $t_{end}$. FIG. 12B shows the result of this correction. After estimating $r(t)$, ForcePhone sets two thresholds to identify the force peaks caused by squeezes. A peak occurs when $r(t) > thr_{high}$. The following samples were $r(t) > thr_{low}$ are defined as parts of this identified peak. This setting is designed to avoid false identification due to the over squeeze and squeeze preparation. Thus $thr_{high}$ is set larger than the assumed squeeze preparation force change, and $thr_{low}$ is set smaller than the over squeeze force change.

In one embodiment, a valid input command is identified when the number of detected peaks is equal to an expected number of squeezes. For example, two squeezes indicate a first command and three squeezes indicate a second command. In another embodiment, a valid squeeze is identified by the width of the peaks and the peak-to-valley ratio as well as the number of detected peaks. Other predefined criteria for detecting a peak are also contemplated by this disclosure.

ForcePhone has been implemented on both Android and iOS devices. An Android implementation can run as a standalone app; the force estimation is implemented as a library in native code (C++) which we integrate into the app via Java Native Interface (JNI). On the other hand, the current iOS implementation requires the force estimation to be done at a remote server using Matlab. Both implementations provide real-time force estimations. The delay between recording each chirp and receiving a force estimation is 15 ms and 61 ms at the local and remote implementations, respectively.

One implementation challenge is that ForcePhone needs accurate time synchronization between the phone speaker and microphone to extract valid structure-borne propagations. However, both iOS and Android platforms don't meet this real-time requirement since both take 20-100 ms to run the play/record audio command. To overcome this difficulty, ForcePhone adds 10 pilot sequences ahead of the used chirps. In this synchronization, ForcePhone checks if the received signal contains the identical sent pilots, such as having the same stop time among pilots. In experiments, more than 95% of the received pilots have less than 5-sample jitters in their stop time, and 15% of trials on Android experience a special 960-sample delay before the 4th pilots. The criterion for ForcePhone to finish this synchronization test is the existence of these 10 pilots, and 50% of received pilots have the exact same stop time, and the last three pilots have less than 5-sample jitters. Once the pilots are identified correctly, the timing of the last pilot is used as a reference to extract the structure-borne propagation from the subsequent chirps as described earlier.

Figure 13:
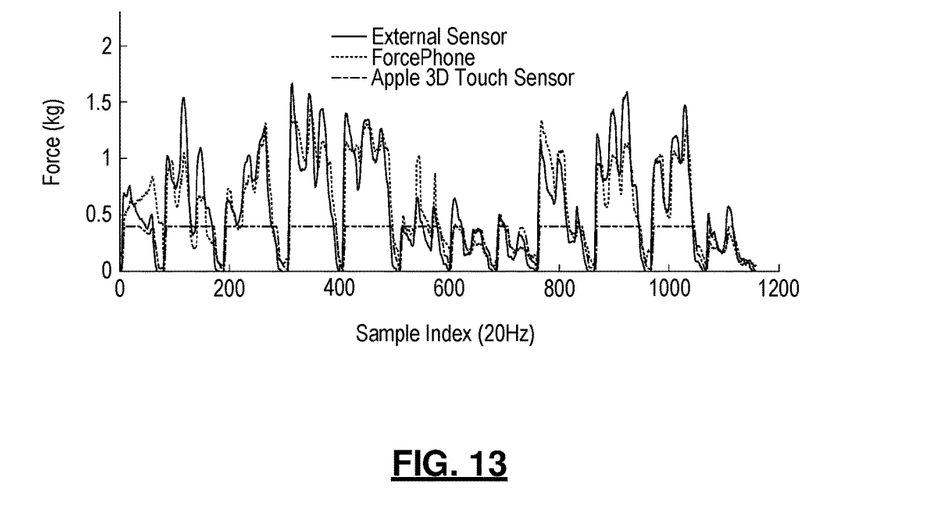
FIG. 13 is a graph illustrates the accuracy for force estimation for twelve different touch events.

The accuracy of force estimation is evaluated by using the mean square errors and correlation coefficients where the former represents the ability to estimate exact force while the later indicates the capability to learn how force is changed. FIG. 13 shows an example of 12 different touches when the iPhone 6s is held in left hand and pressed with left thumb. The applied force is estimated by the internal Apple 3D Touch sensors, external force sensors, and ForcePhone. Since Apple 3D Touch can only provide normalized results and no documented interpretation of the sensed values is available, so post-hoc translation was built based on an external force scale. The sensed value was found to be linear in the applied force, and the maximum value is reached when 380 g is applied.

As shown in FIG. 13, the proprietary sensors used in Apple 3D Touch captures the force change below its maximum (380 g in this case) with high accuracy. Even though ForcePhone estimates the force under 380 g with less accuracy, it captures most force-change characteristics as shown in FIG. 13. Meanwhile, ForcePhone can estimate the force above 380 g without using any additional sensors.

The mean square error of this in-hand example is 205 g and the correlation coefficient to the force estimated by external sensors is 0.87. Compared to the maximum sensed force up to 3 kg, this error is tolerable for most force-sensitive apps as shown later. When the phone is stationary on a wooden table, the mean square error falls to 54 g and the correlation coefficient increases to 0.91. Note that the error in estimating the exact value of the applied force could change if the force is applied in a different way than the calibration. For example, there might be an estimation drift, so applying a varying force from 500 g to 1000 g might be estimated wrongly as changing from 400 g to 900 g plus the previously-mentioned errors. However, this feature doesn't hurt the experience of using ForcePhone because users are not aware of the exact value of the force applied to a phone unless this value is shown in the user interface. With a proper user interface design, even though the estimated force is 100 g less than the real force applied to the phone, users can easily learn to adjust the applied force for getting a correct response. Actually, even the proprietary sensors used for 3D Touch have about 100 g errors between the corners of touch screen, and it is suggested not to be used for estimating exact force. In the current setting, when the force is applied to the middle area of the phone, the estimated force (in g) is calculated as $f(t)=15+230\sqrt{r(t)}+2800r(t)$ in iPhone 6s and $f(t)=1900r(t)$ on Galaxy Note 4. As shown in the usability study, this setting is adequate for building useful force-sensitive and squeezable apps.

The estimation of force based on sound propagation becomes erroneous if there is a strong audio noise with a similar structure as the chirps used in ForcePhone. For example, the mean square error of ForcePhone can increase from 50 g to more than 500 g when the same chirps are played by nearby computers' speakers. Even though this is the natural limitation of any audio-based application, it is not the case in most real-life scenarios. In some measurements, ForcePhone is shown to be resistant to: (1) real-life background audio noise such as music being played in the testing room, (2) inter-device interference from ForcePhone running on another nearby device, and (3) self-interference from the audio played on the same device. To study the performance degradation caused only by the audio noise, rather than the force instability of human hands or other movement noises, the test phone was kept stationary on a wooden table and no force is applied. The standard deviation of force estimations is recorded and reported. This estimated force variation also represents errors when there is a force applied to the phone if the received noise is modeled as an additive noise.

Particularly, an Apple MAC Air or an iPhone 6s was placed on the same surface as test devices. Multiple sets of noises were played, but no significant differences were observed, so we only report the results of music-playing noise, i.e., rock music "Jump—Van Halen" or gaming background music "Spot On". Since both the test device and the noise source are on the same table, the results account for the vibration coupling and the noise transmitted through the surface.

Figure 14:
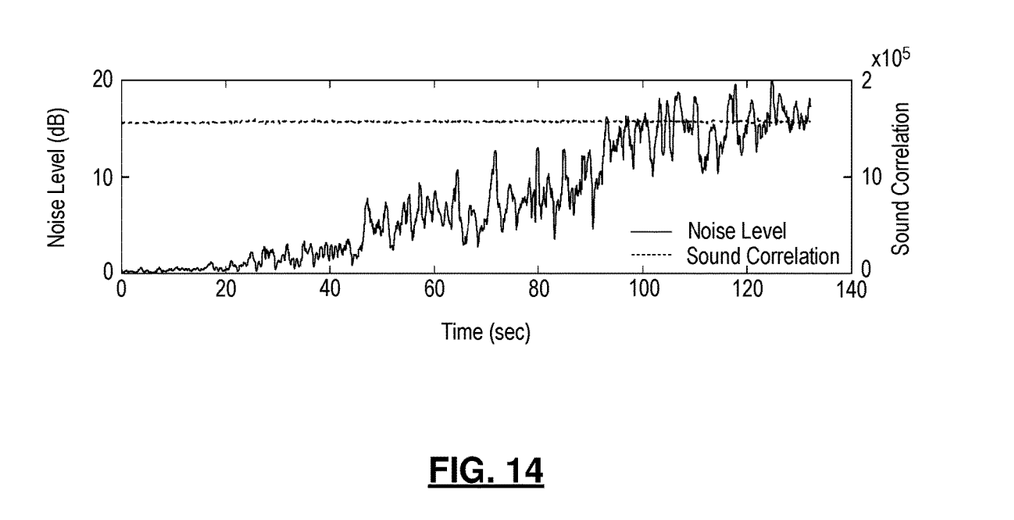
FIG. 14 is a graph illustrating the resistance of force estimation to presence of background noise.

ForcePhone was found to be resistant to most external real-life noises. As shown in FIG. 14, even when the rock music is played at full-volume by a laptop 20 cm away from the test device, the sound correlation of the used chirps doesn't change much. This is because most human (singing or chatting) noises have limited signals in the 20-22 kHz range. Moreover, this natural noise usually has only a limited correlation to our 1200-sample chirps. In this measurement, the increased estimation errors are less than 10 g, which does not affect most of ForcePhone's functionality, even when the noise level is 20 dB higher than the used chirps.

Figure 15A:
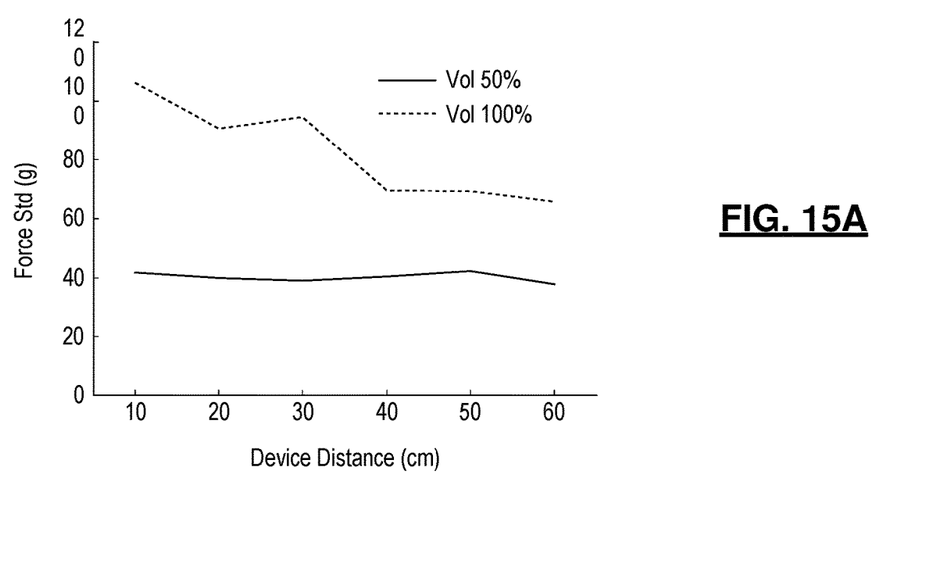
FIGS. 15A and 15B are graphs resistance of force estimation to inter-device interference and self-interference, respectively.

Compared to the uncorrelated noises, ForcePhone is more sensitive to the noise that has a similar structure as the chirp it uses. Solutions of this issue are critical in allowing multiple phones to run ForcePhone in the same environment. To measure this, another device played the same chirps used by ForcePhone, but with random stop time between consecutive chirps. This is designed to learn the average performance when two devices run ForcePhone simultaneously. As shown in FIG. 15A, the average estimated error increases to 110 g when the correlated noise is played at full-volume by another device. This trend is mitigated when the noise volume is reduced. Since ForcePhone only requires the designed chirps to be played at 50% of full-volume, multiple devices can run ForcePhone if they are at least 10 cm apart from each other.

Figure 15B:
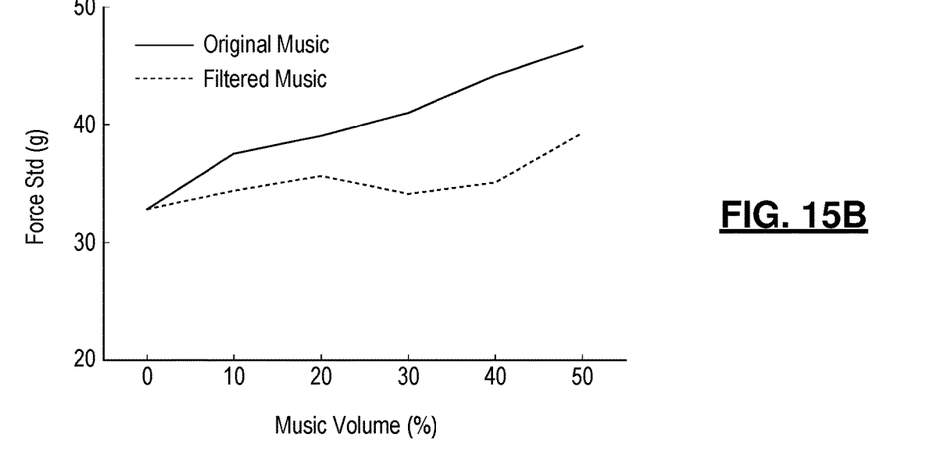

In the last scenario, an evaluation was made as to whether other audio signals can be played on the same device when ForcePhone is running. This capability is critical to the user experience, especially when using ForcePhone for a game control. Background music from a game was played from the same device when ForcePhone is running. As shown in FIG. 15B, when the music is played by the same speaker at 50% of full-volume, ForcePhone experiences about 20 g of additional estimation error, which does not affect the core functionality of ForcePhone. Moreover, when the played music is processed further by using a 15 kHz low-pass filter, the imposed error decreased further to 5 g. Note that the current design of ForcePhone allows game music to be played at most 50% of full-volume, as the other 50% is dedicated for ForcePhone's functionality. This limitation can be addressed when the phone development kit supports streaming music/chirps to different speakers (devices usually have 2 or more speakers, but only one of them can be used at a time).

Power consumption of ForcePhone was measured with the Monsoon Power Monitor on Galaxy Note 4. For the baseline measurements, the phone's radios were turned off and estimate the force through our JNI/C++ local implementation. Each scenario ran for 20 seconds in 6 different states: 1) idle, with the screen off, 2) backlight, with the screen displaying a white background, 3) ForcePhone, 4) website surfing, when networking is enabled, and 5) video game, "Puzzle&Dragon". These measurement results are summarized in Table 1 below.

TABLE 1

| Setting | Idle | Backlight | ForcePhone | Website | Game |
|---------|------|-----------|------------|---------|------|
| Power(mean) | 33 | 856 | 1160 | 2564 | 3692 |

Activating the naive implementation of ForcePhone consumes an additional power of 304 mW compared to the case when nothing is executed and background is on. More than 90% of this power consumption comes from using the hardware of speaker, microphone, and accelerometer—this is consistent with the results. The computation cost of ForcePhone is minimal since it builds a model to estimate the applied force rather than fingerprinting the sound changes. Note that the ratio of ForcePhone's power consumption is dependent on its usage. For example, though ForcePhone incurs 26% power overhead (compared to the blacklight case) when it is used to select app options at home screen, users won't press this option for a long time and ForcePhone can be turned off once the selection is done. If the proposed squeezable back function is used for web surfing, activating ForcePhone incurs only an 11% power-consumption overhead, which reduces the life of Note 4's 12 Wh battery by about 30 min. The percentage overhead is reduced further if ForcePhone is used for game control or when microphones or speakers have been activated for other purposes.

ForcePhone has been shown to be able to expand user input interfaces by using only built-in sensors. Several demonstrative apps have been developed and tested, but there are many other use-cases of ForcePhone. To examples are: (1) a hard-pressed option, which is similar to the 3D Touch on iPhone 6s where varying options are given to users when applying different amounts of force to buttons, and (2) the squeezable back of a phone, which allows users to surf the previous webpage by just squeezing the phone. Note ForcePhone is not limited to these two use-cases, and can extend human-mobile interactions in various ways. For example, it has been shown useful to zoom in/out maps by squeezing phones or type upper-case letters by applying force to keyboards.

Mobile phones or wearables are good candidate platforms for mobile health apps since people carry them all time. For example, systems of notifying/requesting users to walk or excise are now built in most commodity phones. Researchers have also shown the benefits of drinking more water via mobile apps. ForcePhone can provide a new function/capability of these systems because it can determine how hard a user squeezes/touches the phone. As shown in FIG. 19(b), this functionality can be used as a replacement of force-finger-trainer that is helpful for the people with disability and those who use hands and fingers excessively for their work, e.g., computer programmers.

ForcePhone can also be implemented in wearable devices that have even less space for user inputs than smartphones. Unfortunately, current wearable devices usually have less sensing capabilities than smartphones, especially for the microphone sensitivity and sample rate. For example, Samsung Gear S (watch) can only support an audio sample rate up to 32 kHz, which is inadequate for the current design of ForcePhone. Apple Watch hardware is found to be the best to implement ForcePhone, but its current API does not yet support data reading from the audio queue and process audio data in real time. In future, we expect the sensing capability of wearables to improve so that ForcePhone can be implemented and used for numerous apps.

ForcePhone provides an inexpensive solution that adds a force-sensitive and squeezable interface to commodity phones without any hardware modification/addition. ForcePhone has been implemented on iOS and Android platforms, and several apps based on its functionality have been developed and tested. Our evaluation has shown ForcePhone to provide comparable performance as augmented proprietary force sensors and to be robust to most real-life noises. The proposed apps are easy to use with higher than 90% accuracy and minimal overheads.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for estimating force applied to a touchscreen of a mobile device, comprising:
    determining a model for the mobile device, where the model defines a mathematical relationship between magnitude of force applied to a touchscreen of the mobile device and change in a sound signal propagating through the mobile device;
    emitting a sound signal from a speaker of the mobile device while a force is applied to the touchscreen;
    receiving, by a microphone in the mobile device, the sound signal emitted from the speaker;
    estimating, by a computer processor of the mobile device, the force applied to the touchscreen from the emitted sound signal and the received sound signal and using the model.

2. The method of claim 1 wherein the sound signal emitted from the speaker is inaudible to user of the mobile device.

3. The method of claim 1 wherein the sound signal emitted from the speaker has a frequency greater than 18 kHz.

4. The method of claim 1 wherein emitting a sound signal generating further comprises sweeping frequency of the sound signal generated by the speaker across a range of frequencies.

5. The method of claim 1 wherein estimating the force applied further comprises
    correlating the received sound signal with the emitted sound signal;
    identifying largest correlation peak between the received sound signal and the emitted sound signal;
    determining magnitude of the received sound signal immediately preceding the largest correlation peak;
    determining a change in propagation of the emitted sound signal using the magnitude of the received sound signal immediately preceding the largest correlation peak; and
    computing magnitude of force applied to touchscreen as a function of the change in propagation of the emitted sound signal.

6. The method of claim 5 wherein determining a change in propagation of the emitted sound signal further comprises
    detecting beginning of a touch on the touchscreen;
    determining magnitude of the received sound signal at beginning of a touch, $s_{start}$;
    determining signal changing ratio, r(t), at subsequent time in accordance with $r(t)=(s(t)-s_{start})/s_{start}$, where s(t) is magnitude of the received sound signal at the subsequent time, t.

7. The method of claim 6 wherein computing magnitude of force applied to a touchscreen as $f(t)=\sqrt{r(t)}+8r(t)$.

8. The method of claim 1 wherein the model is further defined as a linear regression model.

9. The method of claim 1 further comprises detecting a touch on the touchscreen and estimating the force applied to the touch screen in response to detecting the touch on the touchscreen.

10. The method of claim 1 further comprises detecting a squeeze of the mobile device from the emitted sound signal and the received sound signal.

11. The method of claim 10 wherein detecting a squeeze of the mobile device by correlating the received sound signal with the emitted sound signal, detecting peaks in the correlated sound signal, and identifying the squeeze based on number of detected peaks in the correlated sound signal, width of the detected peaks and peak-to-valley ratio for the detected peaks.

12. A system for estimating force applied to a touchscreen of a mobile device, comprising:
    a speaker integrated into the mobile device;
    a sound manager operably coupled to the speaker and, in response to a trigger, generates a sound signal via the speaker, where the sound signal has a frequency greater than 18 kHz;
    a data store that stores a model for estimating force, wherein the model defines a mathematical relationship between magnitude of force applied to the touchscreen of the mobile device and change in a sound signal propagating through the mobile device
    a microphone integrated into the mobile device;
    a force estimator configured to receive sound signals captured by the microphone and, in response to detecting a touch on the touchscreen, estimating the force of the touch using the model, wherein the force estimator computes a change in the sound signal propagating through the mobile device from the sound signal emitted from the speaker and the sound signals captured by the microphone, and determines the force of the touch from the computed change in the sound signal, the sound manager and the force estimator are implemented by processor readable instructions executed by a computer processor in the mobile device.

13. The system of claim 12 wherein the sound manager generates the sound signal by sweeping frequency of the sound signal generated by the speaker across a range of frequencies.

14. The system of claim 12 wherein the sound manager sets audio volume of the speaker to fifty percent of maximum audio volume.

15. The system of claim 12 further comprises an application executing on the mobile device, wherein the sound manager generates the sound signal upon detecting execution of the application.

16. The system of claim 12 wherein the model is further defined as a linear regression model.

17. The system of claim 12 wherein the force estimator computes a change is the sound signal by
correlating the received sound signal with the emitted sound signal;
identifying largest correlation peak between the received sound signal and the emitted sound signal;
determining magnitude of the correlation peak immediately preceding the largest correlation peak;
determining a change in propagation of the emitted sound signal using the magnitude of the correlation peak immediately preceding the largest correlation peak; and
computing magnitude of force applied to touchscreen by inputting the change in propagation of the emitted sound signal into the model.

18. The system of claim 17 wherein the force estimator determines the change in propagation by comparing the magnitude of the correlation peak immediately preceding the largest correlation peak with beginning of the touch on the touchscreen.

19. The system of claim 12 wherein the mobile device is further defined as a mobile phone.

20. A method for estimating force applied to a mobile device, comprising:
determining a model for the mobile device, where the model defines a mathematical relationship between magnitude of force applied to the mobile device and change in a sound signal propagating through the mobile device;
emitting a sound signal from a speaker of the mobile device while a force is applied to the mobile device;
receiving, by a microphone in the mobile device, the sound signal emitted from the speaker;
estimating, by a computer processor of the mobile device, the force applied to the mobile device from the emitted sound signal and the received sound signal and using the model.

21. The method of claim 20 wherein the sound signal emitted from the speaker is inaudible to user of the mobile device.

22. The method of claim 20 wherein the sound signal emitted from the speaker has a frequency greater than 18 kHz.

23. The method of claim 20 wherein emitting a sound signal generating further comprises sweeping frequency of the sound signal generated by the speaker across a range of frequencies.

24. The method of claim 20 wherein estimating the force applied further comprises
correlating the received sound signal with the emitted sound signal;
identifying largest correlation peak between the received sound signal and the emitted sound signal;
determining magnitude of the received sound signal immediately preceding the largest correlation peak;
determining a change in propagation of the emitted sound signal using the magnitude of the received sound signal immediately preceding the largest correlation peak; and
computing magnitude of force applied to mobile device by inputting the change in propagation of the emitted sound signal into the model.

25. The method of claim 24 wherein determining a change in propagation of the emitted sound signal further comprises
detecting beginning of a touch on the mobile device;
determining magnitude of the received sound signal at beginning of the touch, $s_{start}$;
determining signal changing ratio, $r(t)$, at subsequent time in accordance with $r(t)=(s(t)-s_{start})/s_{start}$, where $s(t)$ is magnitude of the received sound signal at the subsequent time, t.

26. The method of claim 20 wherein the model is further defined as a linear regression model.

* * * * *